Sept. 28, 1965   O. DUROUCHOUX   3,208,303
ENERGY STORING DEVICE OF THE FLYWHEEL TYPE
IN PARTICULAR FOR MOTOR VEHICLES
Filed Nov. 3, 1961   3 Sheets-Sheet 1
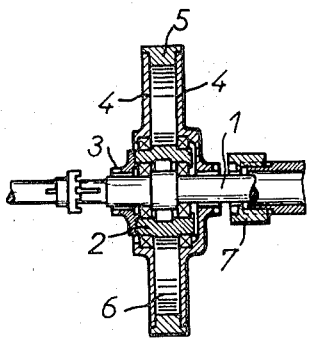
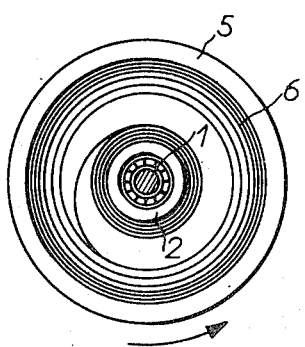
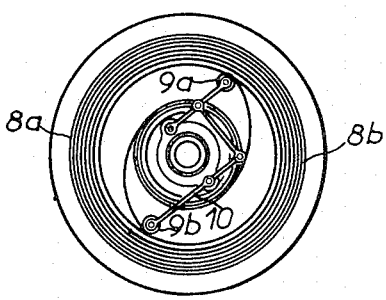
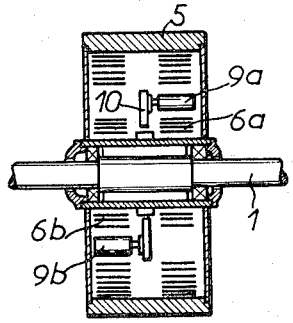
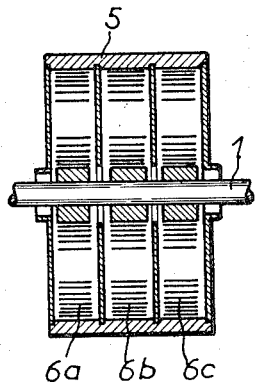
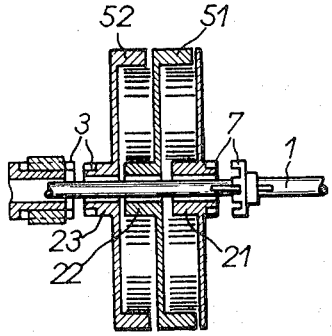
Inventor
OLIVIER DUROUCHOUX
by:
Attorney Sept. 28, 1965　　　　O. DUROUCHOUX　　　3,208,303
ENERGY STORING DEVICE OF THE FLYWHEEL TYPE
IN PARTICULAR FOR MOTOR VEHICLES
Filed Nov. 3, 1961　　　　　　　　　　3 Sheets-Sheet 2
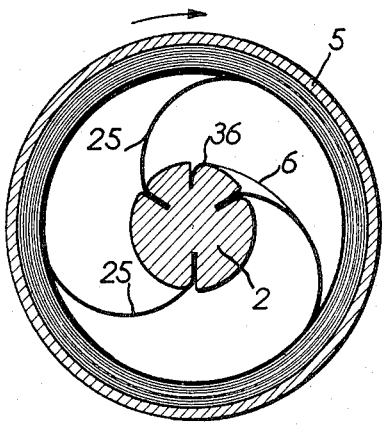
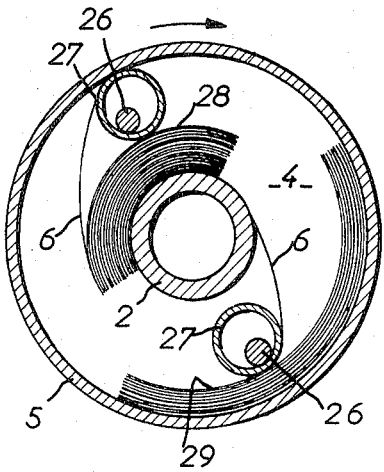
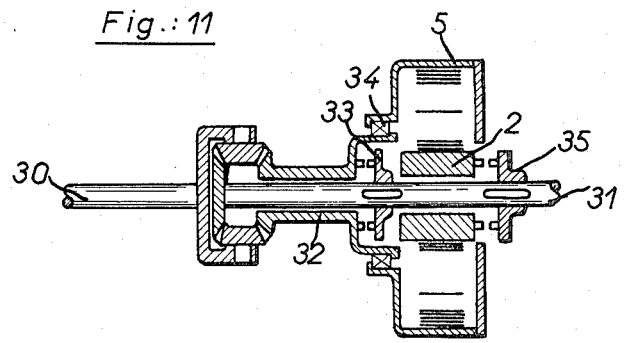
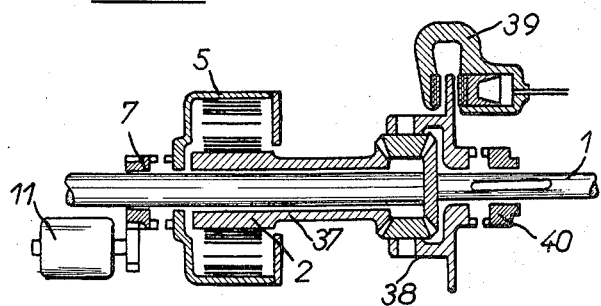
Inventor:
OLIVIER DUROUCHOUX
by
Attorney Sept. 28, 1965  O. DUROUCHOUX  3,208,303
ENERGY STORING DEVICE OF THE FLYWHEEL TYPE
IN PARTICULAR FOR MOTOR VEHICLES
Filed Nov. 3, 1961  3 Sheets-Sheet 3
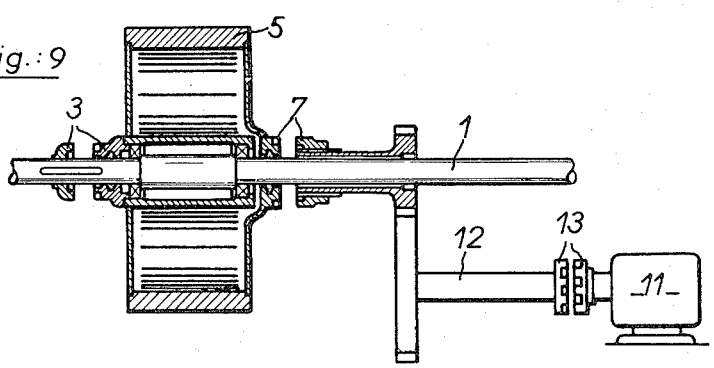
Fig.: 9
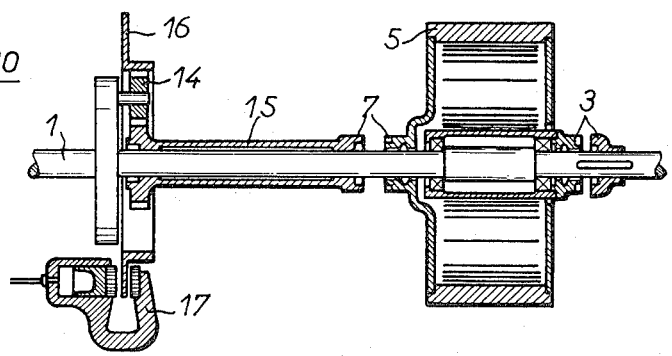
Fig.: 10
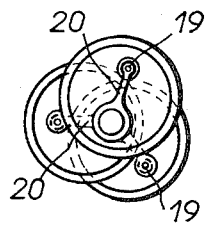
Fig.: 13
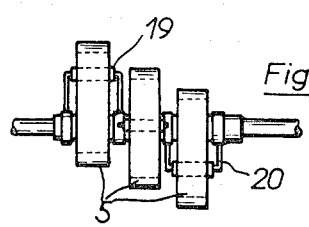
Fig.: 14
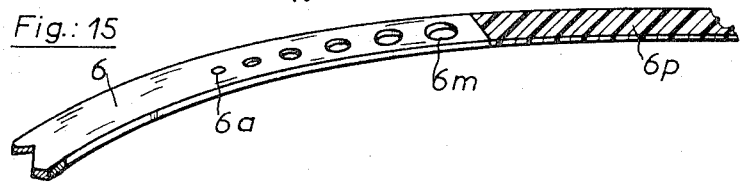
Fig.: 15
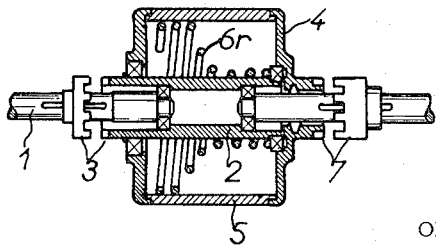
Fig.: 16
Inventor:
OLIVIER DUROUCHOUX
by
Attorney _United States Patent Office_

3,208,303
Patented Sept. 28, 1965

3,208,303
ENERGY STORING DEVICE OF THE FLYWHEEL TYPE IN PARTICULAR FOR MOTOR VEHICLES
Olivier Durouchoux 94 Rue du Bac, Paris, France
Filed Nov. 3, 1961, Ser. No. 150,091
Claims priority, application France, Nov. 9, 1960, 843,421; Oct. 20, 1961, 876,578
15 Claims. (Cl. 74—572)

The faculty possessed by flywheels of storing kinetic energy has long since led to their being used wherever it is required to employ a high mechanical power that may even be greater, temporarily, than that delivered by the available powerplant. The flywheel principle is commonly used for presses and rolling mills, and inertia starters constitute another example of its application.

Although it has already been proposed to use such a flywheel in a vehicle, notably with a view to imparting thereto a momentary acceleration that is transiently greater than that which the engine is able to provide, this application has never become common practice, for the problems connected with designing a transmission system of necessarily variable ratio between a flywheel and the driving wheels of a vehicle present considerable difficulties from the mechanical engineering standpoint. Clutches convert a notable part of the energy involved into heat, and their design is considerably complicated thereby. The more flexible electrical type of transmission, on the other hand, tends to be heavy and costly.

It is one object of the present invention to transmit, progressively, yet by means that are both simple and easy to engineer mechanically, the energy of a flywheel to a vehicle, or, more generally, to a rotating or rolling body.

It is another object of the invention to provide a type of flywheel that is particularly suited to positively transferring its mechanical energy to a shaft about which it rotates.

A flywheel according to the invention consists essentially of at least one weighty elongated element offering but little resistance to bending, such as a chain, a thin wire or metal strip, said element being stored through being wound between a central hub and an outer circular casing with a residual radial clearance. Accessorily, guiding means comprising lateral flanges and if necessary, other devices inserted between the turns, can be used to correctly position said element which is secured to said hub and, if necessary, to said cylindrical casing. The hub and the casing are associated to means enabling them to be rotated separately, to correspond to charging and discharging of the flywheel, respectively.

The charged state of the flywheel corresponds to a position of the flexible element such that its energy shall be at a maximum. The said element is then applied, butt-wound, against the outer casing by setting the entire assembly in high speed rotation.

If now the hub be integrally united with the shaft about which it rotates freely during the charging operation, it will be seen that the flexible element will gradually wind around said hub, the inertia of the flywheel consisting of the outer casing and the weighty element imparting a torque to said shaft as long as the element keeps winding.

In one particularly advantageous embodiment, use is made of a metal strip having a small thickness of the order of a few tenths of a millimetre for example, in conjunction with flanges that are integral with the casing and serve to center the latter.

It is likewise possible to wind a wire between a hub and a coaxial cylindrical casing of substantial length, with successive coils spaced axially rather than radially in one plane. The wire looks then like a three-dimensional helical rather than a flat spiral spring and it will be noticed that the torque of kinetic nature exerted by said helical flexible wire onto said hub keeps constant whatever may be the wire length actually wound around said hub.

Certain ancillary arrangements which are particularly suited to the principle of the arrangement and which are preferably used concurrently therewith will be described hereinafter and will specifically characterize the various applications of such a flywheel. By virtue of its progressive action and the great flexibility normally possessed by the weighty element, such a flywheel possesses peculiar properties of its own which differ both from those of conventional flywheels and from those of coil springs and which make it a novel industrial product.

These properties become all the more apparent as the speed at which the flexible element is rotated increases, and it is in the specific field of modern high speed engines, and of turbine engines in particular, that such a flywheel would appear to be most simply applicable and to offer the most benefits.

The description which follows with reference to the accompanying drawings, filed by way of example only and not of limitation, will give a clear understanding of the various particularities of the invention and of the art of carrying them into practice.

In the drawings, FIGURE 1 is a schematic axial sectional view of a flywheel according to the invention;

FIGURE 2 is an end view of the flywheel in FIGURE 1, showing one flange removed;

FIGURE 3 is an end view of a device for reducing inertia effects at the beginning of the coiling onto the hub;

FIGURES 4 and 5 illustrate radial guidance devices for the flexible strip;

FIGURE 6 is a further radial guidance device for said strip;

FIGURES 7 and 8 schematically illustrate alternative ways of combining a plurality of flywheels;

FIGURE 9 is a highly diagrammatic illustration of a driving device for a flywheel according to the invention;

FIGURE 10 shows an alternative driving device enabling the energy of the flywheel shaft to be partly recovered when said shaft is braked;

FIGURE 11 shows another alternative driving device in which the outer casing and the hub are interconnected through a differential;

FIGURE 12 illustrates a driving device offering the possibility of reversing the direction of rotation of the hub when recovering the energy of the casing;

FIGURES 13 and 14 are end and side elevation views respectively of a balancing system whereby a plurality of offset flywheels may be used in combination.

FIGURE 15 shows a flexible strip having a mass, a bending stiffness and a friction coefficient locally varying in longitudinal section.

FIGURE 16 shows a flywheel wherein the flexible element is a wire helically wound.

Referring now to the drawings, and in particular to FIGURES 1 and 2, the flywheel according to the invention illustrated therein comprises a hub 2 centered on a shaft 1 and provided with a coupling system 3 consisting for instance of an assembly comprising a synchronizing member and associated dogs, of the type used in ordinary gearboxes.

Two flanges 4 serve to center the casing 5 and form with said hub an annular space in which a metal strip 6 is wound with a residual radial clearance.

Said strip is rigidly fixed to the hub 2 at one end, and its other end may be attached to the casing 5. This other end may indifferently be rendered integral with one of the flanges 4 or be left free, its inertia tending to apply it naturally against the casing 5, and this tendency may be assisted by accentuating the mass or the frictional properties of the said end.

A coupling device 7 serves to drive the casing 5 and the strip 6.

In order to store energy in a flywheel so constituted, the casing 5 is rotated by coupling in 7 with the driving shaft, the hub 2 being free. Even if it is not positively attached to the casing 5, the strip will then be rotated by friction, and its inertia will fetch its butt-wound coil into said casing. This charging operation is performed in the same direction of rotation as the discharging operation and may be assisted by the simultaneous rotation of the casing 5 and the hub 2. The latter, however, may be rotated alone, in which case the strip will be pushed instead of being pulled, or will be centrifugalized only.

To discharge the flywheel of its kinetic energy after it has been spun at high speed, it will suffice to render the hub 2 and the shaft 1 integral by means of the coupling 3. This will cause the metal strip to relax and to assume a form of dynamic equilibrium such that its tension opposes the inertia forces brought into play, the flexural forces being negligible in a first approximation. The turns coiled within the casing are progressively wound onto the hub and are consequently slowed down; their inertia exerts on said hub a tangential force that depends essentially upon the difference between the speed of the hub and that of the casing. At the end of the winding-up process, the inertia of the casing may cause a shock loading to be transmitted unless a special device is provided to uncouple the hub and the shaft, or the casing and the strip, and this can be achieved using an ordinary friction drive for said strip, as explained precedingly.

It is possible, however, to impart a certain flexural stiffness to the strip used, in order to assist its winding onto the hub or, alternatively, inside the casing. This stiffness, which may prevent buckling in certain cases, may be obtained by increasing the thickness or by adopting a wavy transverse profile for the strip, in which case the deformation of the strip represents extra work to be done that is added to or subtracted from the live force in the strip.

It is evident that, conversely, and notwithstanding the fact that, a priori, this would seem to entail greater engineering difficulties, the flexible element can be set under charge when it is wound onto the hub and the casing rendered integral with the shaft to be driven.

FIG. 16 shows a variant of the embodiment of FIG. 1, wherein the flexible elongated element 6r is helically wound. The motive torque exerted on the driven shaft 1 when the coupling device 3 engages the hub 2 has in this case a constant value.

Lastly, the variation in the torque of such a flywheel may be reduced by interposing either a deformable elastic member or a conventional flywheel between the hub and the shaft which the latter rotates. It is to be noted that the flexibility of the strip itself may have a favourable effect in this direction, for example when it tends to maintain the strip applied against the casing. In that case, the impulse resulting from the inertia of the casing can be better distributed and shock loadings avoided.

A preferred embodiment of a device for reducing normally-occurring shock loadings (when the hub is abruptly slowed down because the drive to it is engaged) is shown in FIGURE 3.

The hub 2 to which the extremity of the strip 6 is fixed comprises a plurality of flexible blades 25 secured to it radially at regularly spaced intervals. As a result, the initial coiling of the strip 6 takes place progressively since it implies a coiling up of the said blades in addition, thereby causing the winding diameter of the strip to vary. It is manifest that the lengths and thicknesses of the blades may be specially selected to that end, as well as such other mechanical characteristics as their stiffness and their mass. Provided that these blades are elastic in addition to being merely flexible, they may serve, if necessary, to maintain the strip against the casing 5 in the inoperative configuration. The anchoring points used for the blades and the strip on the hub may if necessary comprise a rounded part 36 designed to distribute the flexural stresses.

The flywheel exerts a variable tangential force on its shaft, and this force furnishes a torque as a result of a rotary reaction of said shaft. It is consequently preferable to provide a centering device in order to reduce the dynamic effects of this variable tangential force, and said device may be elastically mounted for example. Existing vibrations are then tempered by the very mass of the flywheel and serve to reduce possible mutual friction between the turns of the coil.

Such an operating principle raises a variety of technical problems connected with the guidance of the strip and with both the balancing and the driving of the flywheel.

Radial guidance of the strip may be desirable to reduce possible instability in said strip when it is coiled up with the turns spaced from one another. A simple way of achieving this consists in preventing partial unwinding by extending the strip by means of an appropriate length of some material 6p which has a high coefficient of friction and which may be lighter than the rest, an example being rubber. At the same time, advantage may be taken of the fitting of a radial guidance device to introduce symmetry into the system, whereby the action exerted on the shaft of the system is made to come close to a pure torque.

To this end, it will suffice to fix the extremities of at least two strips instead of one symmetrically onto the hub, said strips being adapted to be coiled simultaneously one over the other, or being more simply arranged side by side.

FIGURES 4 and 5 show a flywheel grouping two such flexible strips 6a and 6b of identical length, the external attachment points 8a and 8b and the internal attachment points of each of which are diametrically-opposed, respectively. The said strips are juxtaposed.

Two rollers 9a and 9b having a non-negligible mass are secured to a mobile support 10 so that they remain diametrically-opposed and, if necessary, at equal distances from the shaft. When the flywheel is charged, their inertia applies them against the butt-wound turns of their associated strips. It will be appreciated, therefore, that, by increasing the tension in said strips, any immobilization of the hub will repulse the rollers towards the periphery, and the non-butt-wound portion will then be of diminished length. It will suffice to restrain the support 10 carrying the rollers during the charging process, to cause the rollers to move back towards the centre.

Such a support may consist of two grooves provided along a same diameter on the two faces of a central flange common to the two strips, or may consist of a system of rods forming a double parallelogram, as shown in FIGURES 4 and 5. A device of this type is based exclusively on pivots and is exempt of sliding action; it ensures both the required 180-degree outphasing of the two rollers and their retention at equal distances from the shaft. A simplified alternative arrangement as illustrated in FIGURE 6 may be used, however.

In this figure, the flanges 4 carry a liaison pin 26 for each strip 6, thereby ensuring symmetry. These pins are symmetrically distributed and are located in the intermediate zone comprised between the two extreme positions occupied by the strip, i.e. when it is fully wound onto the hub and into the casing respectively. Rings 27 trunnion about said pins and their diameter is such that the pressure of the strip portion 28 already wound onto the hub 2 exerted against the ring 27 causes said ring to swing round, the farthest area from the hub occupied by said ring thus being located substantially opposite the strip portion 29 still remaining wound in the casing 5. The drawing illustrates the states of both charge and discharge.

Clearly, it is possible to combine several sets of rollers of different characteristics.

It is likewise possible to produce a symmetrical and balanced assembly by allowing several eccentric casings to rest on their respective strips and by providing the said casings with a device the sole purpose of which would be to maintain the correctly outphased, an example being a support 20 centered upon the shaft and equipped with rollers 19 which are symmetrically disposed in relation to said shaft and which bear against the casings 5.

Such a device is illustrated diagrammatically in FIGURES 13 and 14.

It is manifest that a plurality of flywheels of the type hereinbefore described may be arranged on a same shaft and that they may be charged in succession by a motor of low power and be subsequently caused to operate successively or simultaneously.

FIGURE 7 shows one such possible combination of flywheels according to the invention, in which each casing 51, 52, etc., is rendered integral with the adjacent hub 22, 23, etc. In the charged condition, the system is then able to exert a torque the maximum value of which is equal to that of a single flywheel, for a longer duration.

FIGURE 8 illustrates an arrangement in parallel, in which a single flywheel is common to the entirety of the strips. The total torque will then be equal to the sum of the torques of the unitary flywheels.

The devices used to charge and to discharge such flywheels may involve a diversity of well known mechanisms such as clutches, electromagnetic and hydrodynamic couplers, freewheels and force limiters, and more particularly couplings utilizing an elastic member or a flywheel. For this reason, the descriptions given hereinafter with reference to the drawings are intended primarily to give a clear understanding of the manner of operation of a flywheel according to the invention, and do not in any way limit the scope of the invention.

FIGURE 9 illustrates a positive drive for the various mobile components. All the drive devices represented are of the same slipless type, but it is to be understood that many different types may be used.

The casing 5 is connected through the coupling 7 to a charging motor 11. Said motor drives the back-gear shaft 12 through a further coupling 13. The said motor may be an electric or hydraulic motor, or even a turbine that uses the pressure differential prevailing at the exhaust or inlet of the main powerplant. Obviously, only two couplings are required, it being furthermore possible to use free-wheels at 7 or 13.

FIGURE 10 illustrates a method of construction usable to recover part of the kinetic energy of a vehicle when the latter is being braked. Indeed, it is desirable in such cases to drive the casing from the wheel axle in a simple way, even if the efficiency is not very high.

To this end, the shaft 1 carries planet wheels 14 meshing, firstly, with a sleeve 15 which is concentric with said shaft and which can be rendered integral with the casing 5, and, secondly, with a crown wheel 16 fitted with a brake 17. The coupling 3 is as described precedingly. The coupling 7 enables the friction to be reduced when relative speeds are high and is preferably a freewheel which prevents the sleeve 15 from rotating faster than the casing 5.

When braking takes place, the brake 17 becomes operative at the same time as the conventional brake, for example as soon as the brake pedal is depressed. This tends to stop the rotation of the crown wheel 16, and the speed of the sleeve 15 increases and causes the casing 5 to be rotated by the freewheel system 7, thereby enabling an appreciable part of the kinetic energy due to translation of the vehicle to be recovered. This energy can then be retransmitted, when required, to the shaft 1 through the coupling 3.

If convenient, the sleeve 15 may remain integrally united with an auxiliary motor that enables the flywheel to be charged outside the braking periods, or even with a back-gear shaft driven by the main powerplant; this may be convenient in certain circumstances when all of the flywheel power is not ordinarily used.

FIGURE 11 shows a method of construction that reveals the differential character of a flywheel according to the invention.

A driving shaft 30 such as the drive shaft of an internal combustion engine is connected to a driven shaft 31 through a differential the third shaft of which is constituted by a sleeve 32 concentric with the driven shaft, and said sleeve carries dogs 33 and is connected to the casing 5 through a freewheeling system 34. A second set of dogs 35 enables the hub to be made rigid with the driven shaft 31.

Such a method of construction allows the shaft 31 to be driven conventionally by the driving shaft 30, and to this end it will suffice for the dog 33 to be thrust leftwards and to thereby render the shafts 31 and 32 integral with each other.

Disengagement of the dog 33, however, permits a different manner of operation that is a purely dynamic one since the incorporation of a differential imposes a constant ratio on the torques exerted on the shafts 31 and 32. When the motor torque is greater than the torque on the driven shaft 31, the surplus energy that the motor is capable of delivering is stored in the casing 5, rotation of which is accelerated. The shafts 31 and 32 may be engaged together again, however, by means of the dog 33 when the power absorbed by the driven shaft finally becomes of the same order as that delivered by the motor and acceleration of the casing becomes slight only.

The locking of the hub 2 to the driven shaft 31, at 35, causes the strip to be wound onto the hub, and the casing to be accelerated relative to said hub, due to the incorporation of the freewheeling device 34. Momentary power surges can thus be communicated to the shaft 31.

It will be appreciated, therefore, that the flywheel permits an advantageous channelling of transient power surges and that it fulfills the function of a regulator, the motive power of the shaft 30 being consequently delivered at substantially constant torque. It is to be understood that many alternative embodiments are possible, and in particular that the casing may be rendered integral with the planet carrier, the driving and driven shafts fulfilling symmetrical functions.

Lastly, FIGURE 12 illustrates a method of construction wherein the hub 2 may be rendered integral with a shaft 1 in two different ways.

In this figure is illustrated the same casing-driving device as that shown in FIGURE 9, in which an electric motor 11 drives the casing 5 through a toothed sleeve 7 provided with dogs. In this case, however, the hub 2 is connected to one shaft 37 of a differential, the other two shafts of which are the shaft 1 and the planet-carrying rim 38 respectively. The said rim is provided with an arresting device such as a brake 39, and with a further device 40 to enable it to be locked to the shaft 1.

By rendering the shaft 1 integral with the rim 38, it is possible as before to discharge onto the shaft 1 the energy of the flywheel after its casing has first been set spinning at high speed. If the shaft 1 was not previously rotating, the process of winding the strip onto the hub represents no work done, so that the maintaining constant of the energy of the flywheel implies a speeding-up of the casing 5 and of such coil turns as it still contains. Clearly, such a speed-up will still occur, as explained precedingly, though it will be of reduced magnitude, if the shaft 1 was rotating and if the opposing torque transmitted by it corresponds to a certain amount of work done.

The direction of rotation of the shaft will not affect the issue, however, only the nature of the impulse transmitted to the shaft by the flywheel being modified by a change in the direction of rotation of the hub 2. The impulse transmitted may either be short and powerful when the hub and the casing are rotating in opposite directions, or, conversely, be of long duration and moderate intensity.

When the stationary shoes of the brake 39 are applied, the rim 38 is halted and the sleeve 37 is caused to have an angular velocity opposite to that of the shaft 1, thereby enabling a type of impulse to be chosen that is different from that obtained by engaging the dogs 40.

Manifestly, provision may be made for ancillary devices whereby the energy transfers between the three shafts of the differential may be adjusted otherwise than on the "on-off" principle, such devices being substituted for the components 39 and 40.

It is to be clearly understood that the embodiments described hereinabove have been given by way of example only and not of limitation, and that the application of equivalent engineering techniques or principles can in no way exclude an embodiment obtained thereby but not specifically described hereinbefore from the scope of the present invention.

A flywheel executed in accordance with the invention, may, for instance, be used as a conventional flywheel.

A particularly useful application of such a flywheel would appear to be as a high-speed rotor accelerator for a turbine engine. It is common knowledge that this type of engine, and gas turbines in particular, are at a disadvantage in this respect owing to the high inertia and kinetic energy of their rotors. It is possible indeed, should the need arise at least during certain periods, to impart a very fast acceleration to a rotor, by coupling thereto, during said periods, the casing of a flywheel according to the invention. The bringing of this flywheel hub to a stop will enable the desired result to be achieved in a very simple way.

What is claimed is:

1. A flywheel adapted to store kinetic energy supplied by a rotating driving shaft and to supply a progressive torque to a driven shaft, said flywheel comprising in combination a hub, a casing coaxially surrounding said hub, bearing means rotatably supporting said hub and casing, at least one weighty flexible elongated element wound between said hub and said casing, said elongated element having one end secured to said hub and being wound upon itself, the radial distance between the hub and the casing being substantially greater than the combined thickness of each turn of said element, and coupling means for respectively connecting said casing to said driving shaft and said hub to said driven shaft whereby said weighty elongated element wound into and adhering to the casing winds around the hub and exerts a motive torque on the same when said hub is coupled to said driven shaft.

2. A flywheel adapted to store kinetic energy supplied by a rotating driving shaft and to supply a progressive torque to a driven shaft, said flywheel comprising in combination, a hub, a casing coaxially surrounding said hub, bearing means rotatably supporting said hub and casing on said driven shaft, at least one weighty flexible elongated element wound between said hub and said casing, said elongated element being secured to said hub at one end and being wound upon itself, the radial distance between the hub and the casing being substantially greater than the combined thickness of each turn of said element, and coupling means for respectively connecting said casing to said driving shaft and said hub to said driven shaft whereby said weighty elongated element wound into and adhering to the casing winds around the hub and exerts a motive torque on the same when said hub is coupled to said driven shaft.

3. A flywheel adapted to store kinetic energy supplied by a rotating driving shaft and to supply a progressive torque to a driven shaft, said flywheel comprising in combination a hub, a casing coaxially surrounding said hub, bearing means rotatably supporting said hub and casing, at least one weighty flexible elongated element wound upon itself between said hub and said casing, the radial distance between the hub and the casing being substantially greater than the combined thickness of each turn of said element, said elongated element having its one end secured to said hub and its other end free, and coupling means for alternately connecting said casing to said driving shaft and said hub to said driven shaft whereby said weighty elongated element wound into and adhering to the casing winds around the hub and exerts a motive torque on the same when said hub is coupled to said driven shaft.

4. A flywheel adapted to store kinetic energy supplied by a rotating driving shaft and to supply a progressive torque to a driven shaft, said flywheel comprising in combination a hub, a casing coaxially surrounding said hub, bearing means rotatably supporting said hub and casing, at least one weighty flexible elongated element wound upon itself between said hub and said casing, the radial distance between the hub and the casing being substantially greater than the combined thickness of each turn of said element, said elongated element having its one end secured to said hub and its other end free and coupling means for connecting said hub and casing to one and the other of said driving and driven shaft, respectively.

5. A flywheel according to claim 1, in which at least certain of the mechanical characteristics of the flexible elongated element, such as its flexural stiffness, its mass and its coefficient of friction, are nonuniform throughout the length of said element.

6. A flywheel according to claim 1, comprising lateral flanges to guide the elongated element.

7. A flywheel according to claim 1, in which rollers disposed symmetrically about the axis of rotation of the flywheel ensure the radial guidance of a plurality of elongated flexible elements the ends of which are attached in symmetrical fashion to the hub.

8. A flywheel according to claim 1, in which at least one flexible blade of distinctly shorter length than said elongated flexible element is likewise attached to the hub, thereby rapidly increasing the coiled diameter of said elongated flexible element during its initial winding-up phase.

9. A flywheel according to claim 8, in which the hub is provided with blending throats at the points of attachment of the elongated flexible element and the blade.

10. A flywheel according to claim 8, in which said flexible blades are elastic, thereby urging the elongated flexible element against the casing.

11. A device comprising a plurality of flywheels according to claim 1, in which these flywheels are disposed coaxially and in series, each hub being integrally united with the casing that precedes it.

12. A device comprising a plurality of flywheels according to claim 1, in which these flywheels are disposed coaxially and in parallel, a plurality of independent hubs being associated to a single casing.

13. A flywheel device for temporarily storing kinetic energy comprising in combination a rotating shaft; a hub coaxial with and traversed by said shaft; a casing coaxially surrounding said hub; at least one weighty flexible elongated element wound around said hub and secured thereto with one end; a sleeve coaxial with and traversed by said shaft; a crown wheel including brake means; a train of planet gears connected respectively to said shaft, said sleeve and said crown wheel; and coupling means for connecting, respectively, said casing to said sleeve and said hub to said shaft.

14. A flywheel device for temporarily storing kinetic energy comprising in combination a driving shaft and an inner and outer shaft in coaxial alignment; a differential connecting the driving shaft with said inner and outer shafts; a hub coaxial with and traversed by said inner shaft; a casing coaxially surrounding said hub; at least one weighty flexible elongated element wound around the hub and secured thereto with one end; a free wheel connecting said casing to said outer shaft; and coupling means connecting, respectively, said inner shaft to said outer shaft and to said hub.

15. A flywheel device for temporarily storing kinetic energy comprising in combination a rotating shaft; a hub coaxial with and traversed by said shaft; a casing coaxially surrounding said hub; at least one weighty flexible elongated element wound around said hub and secured thereto with one end; a differential including two symmetrical gear wheels fixed to said shaft and said hub respectively, a planet carrying rim including braking means; and coupling means for connecting, respectively, said casing to a rotating power source and said planet carrying rim to said shaft in alternance to the brake.

References Cited by the Examiner
UNITED STATES PATENTS

| | | |
|---|---|---|
| 197,177 | 11/77 | Robinson. |
| 299,013 | 5/84 | Schleicher _____ 74—572 |
| 1,541,411 | 6/25 | Davis _____ 74—572 |
| 2,043,695 | 6/36 | Brownlee. |
| 2,888,121 | 5/59 | Brueder. |

BROUGHTON G. DURHAM, *Primary Examiner.*

DON A. WAITE, *Examiner.*